US012559048B2

(12) United States Patent
Nagura

(10) Patent No.: US 12,559,048 B2
(45) Date of Patent: Feb. 24, 2026

(54) VEHICLE

(71) Applicant: SUBARU CORPORATION, Tokyo (JP)

(72) Inventor: Tatsunori Nagura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 64 days.

(21) Appl. No.: 18/888,311

(22) Filed: Sep. 18, 2024

(65) Prior Publication Data

US 2025/0100477 A1     Mar. 27, 2025

(30) Foreign Application Priority Data

Sep. 27, 2023     (JP) ................................. 2023-166516

(51) Int. Cl.
G06F 13/00          (2006.01)
B60R 16/023        (2006.01)
H04W 4/40          (2018.01)

(52) U.S. Cl.
CPC ............. B60R 16/023 (2013.01); H04W 4/40 (2018.02)

(58) Field of Classification Search
None
See application file for complete search history.

(56) References Cited

U.S. PATENT DOCUMENTS

| | | | | |
|---|---|---|---|---|
| 4,951,281 A | * | 8/1990 | Muto | .................... H04L 1/1803 370/449 |
| 2013/0025953 A1 | | 1/2013 | Saeki | |
| 2015/0191175 A1 | * | 7/2015 | Zhang | ................... B60W 40/10 701/36 |
| 2018/0234498 A1 | * | 8/2018 | Sangameswaran | ..... H04L 12/18 |

FOREIGN PATENT DOCUMENTS

JP          2020-167573 A     10/2020

* cited by examiner

*Primary Examiner* — Henry Tsai
*Assistant Examiner* — Dean Phan
(74) *Attorney, Agent, or Firm* — TROUTMAN PEPPER LOCKE LLP

(57)          ABSTRACT
A vehicle includes first unit(s), second unit(s), and an intermediate unit. The intermediate unit is configured to mediate communication between the communication device and the first unit(s) or the second unit(s), and include intermediate unit processor(s) and intermediate unit memory (ies) coupled to the intermediate unit processor(s). The intermediate unit processor(s) are configured to: when a first message including a first functional address and a predetermined command is received from a communication device, transmit the first message to the first unit(s); when a second message including a second functional address and the command is received from the communication device, transmit the first message to the first unit(s); when the first message is received from the communication device, transmit the second message to the second unit(s); and when the second message is received from the communication device, transmit the second message including the to the second unit(s).

4 Claims, 5 Drawing Sheets

FIG. 2

| ADDRESS PART | COMMAND PART |
|---|---|
| 3 bytes | 5 bytes |

FIG. 3

| RECEIVED FUNCTIONAL ADDRESS | TRANSMISSION DESTINATION | | |
|---|---|---|---|
| | FIRST COMMUNICATION BUS | SECOND COMMUNICATION BUS | THIRD COMMUNICATION BUS |
| FUNCTIONAL ADDRESS A | FUNCTIONAL ADDRESS A | FUNCTIONAL ADDRESS B | FUNCTIONAL ADDRESS A AND FUNCTIONAL ADDRESS B |
| FUNCTIONAL ADDRESS B | FUNCTIONAL ADDRESS A | FUNCTIONAL ADDRESS B | FUNCTIONAL ADDRESS A AND FUNCTIONAL ADDRESS B |
| FUNCTIONAL ADDRESS X | FUNCTIONAL ADDRESS A | FUNCTIONAL ADDRESS B | FUNCTIONAL ADDRESS A AND FUNCTIONAL ADDRESS B |

VEHICLE

CROSS-REFERENCE TO RELATED APPLICATIONS

The present application claims priority from Japanese Patent Application No. 2023-166516 filed on Sep. 27, 2023, the entire contents of which are hereby incorporated by reference.

BACKGROUND

The disclosure relates to a vehicle.

Japanese Unexamined Patent Application Publication No. 2020-167573 discloses a technology in which an external device is coupled to a vehicle and diagnoses malfunctions in various electronic devices of the vehicle.

SUMMARY

An aspect of the disclosure provides a vehicle to which a communication device is to be coupled. The vehicle includes one or more first units, one or more second units, and an intermediate unit. The intermediate unit is configured to mediate communication between the communication device and the one or more first units or the one or more second units. The intermediate unit includes one or more intermediate unit processors and one or more intermediate unit memories. The one or more intermediate unit memories are coupled to the one or more intermediate unit processors. The one or more intermediate unit processors are configured to perform a process including, when a message including a first functional address for the one or more first units and a predetermined command is received from the communication device, transmitting the message including the first functional address and the predetermined command to the one or more first units. The one or more intermediate unit processors are configured to perform a process including, when a message including a second functional address for the one or more second units and the predetermined command is received from the communication device, transmitting the message including the first functional address and the predetermined command to the one or more first units. The one or more intermediate unit processors are configured to perform a process including, when the message including the first functional address and the predetermined command is received from the communication device, transmitting the message including the second functional address and the predetermined command to the one or more second units. The one or more intermediate unit processors are configured to perform a process including, when the message including the second functional address and the predetermined command is received from the communication device, transmitting the message including the second functional address and the predetermined command to the one or more second units.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 2 illustrates the structure of a message according to the embodiment of the disclosure;

FIG. 3 illustrates a functional address conversion table according to the embodiment of the disclosure;

DETAILED DESCRIPTION

To transmit a message from an external device coupled to a vehicle to various electronic devices mounted on the vehicle, a functional address that can identify multiple transmission destinations may be used to transmit the message to the electronic devices.

The types of functional addresses set for electronic devices may vary among manufacturers. Since the vehicle includes electronic devices of various manufacturers, part of the electronic devices may be unable to determine that a message using the functional address is directed to them. If the message is not transmitted to part of the electronic devices as intended, there is a possibility that malfunction diagnosis cannot be performed and the user's convenience decreases.

It is desirable to improve convenience in communication between a vehicle and a communication device.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
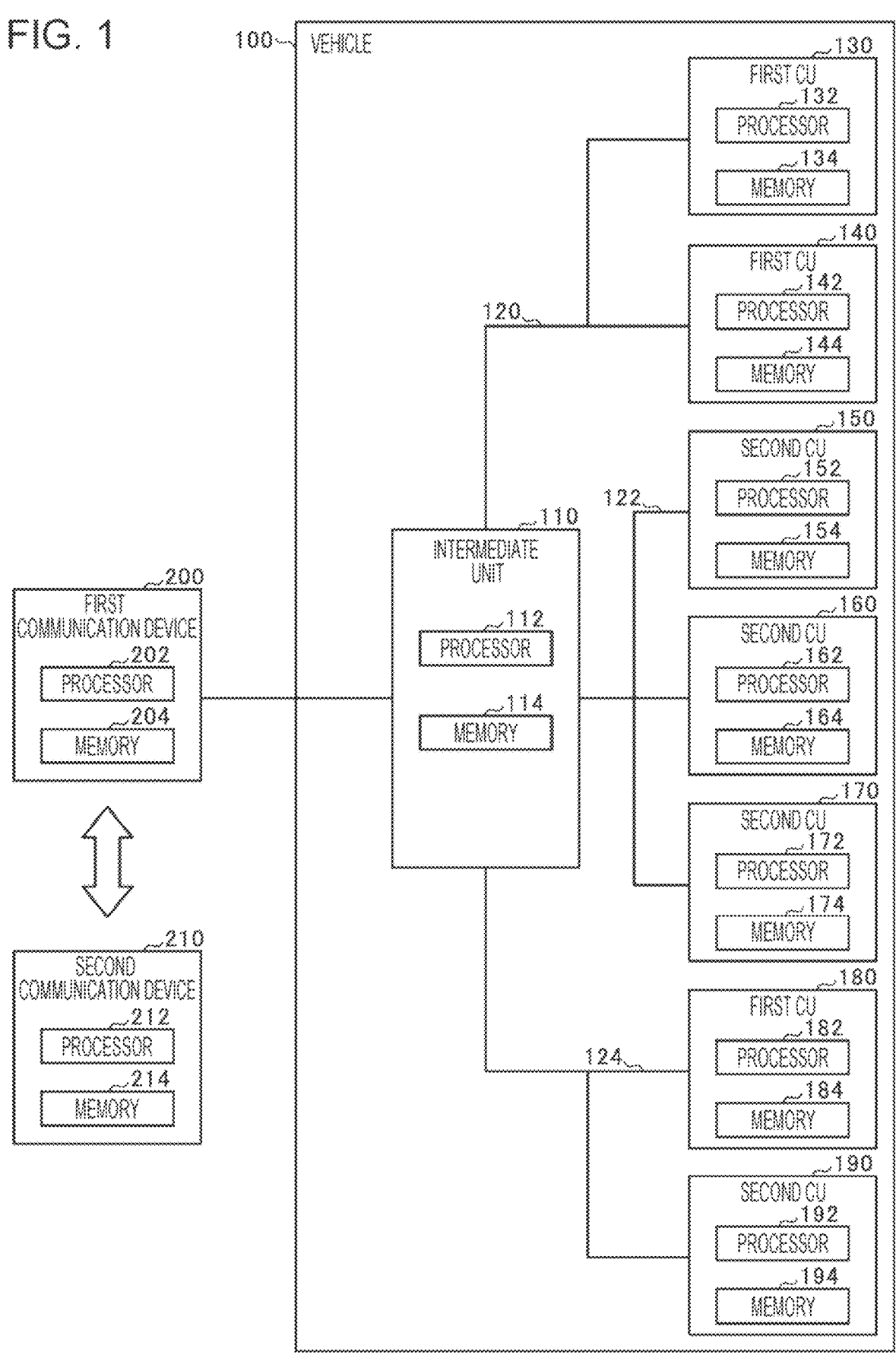
FIG. 1 is a functional block diagram illustrating a vehicle according to an embodiment of the disclosure.

FIG. 1 is a functional block diagram illustrating a vehicle 100 according to this embodiment. Examples of the vehicle 100 include a hybrid vehicle including an engine and a motor as traveling drive sources.

As illustrated in FIG. 1, the vehicle 100 includes an intermediate unit 110, a first communication bus 120, a second communication bus 122, and a third communication bus 124.

The vehicle 100 includes first control units 130 and 140. The first control units 130 and 140 can communicate bidirectionally with the intermediate unit 110 via the first communication bus 120.

The vehicle 100 includes second control units 150, 160, and 170. The second control units 150, 160, and 170 can communicate bidirectionally with the intermediate unit 110 via the second communication bus 122.

The vehicle 100 includes a first control unit 180 and a second control unit 190. The first control unit 180 and the second control unit 190 can communicate bidirectionally with the intermediate unit 110 via the third communication bus 124.

The first control units 130, 140, and 180 and the second control units 150, 160, 170, and 190 are different in terms of manufacturers. In FIG. 1, "CU" represents "control unit".

In this embodiment, the first control units 130, 140, and 180 are configured to determine that a message including a functional address A described later in detail is directed to them. The first control units 130, 140, and 180 are not configured to determine that a message including a functional address B described later in detail is directed to them.

In this embodiment, the second control units 150, 160, 170, and 190 are configured to determine that a message including the functional address B described later in detail is directed to them. The second control units 150, 160, 170, and 190 are not configured to determine that a message including the functional address A described later in detail is directed to them.

That is, the functional address A is a functional address for transmission of a message to the first control units 130, 140, and 180. The functional address B is a functional address for transmission of a message to the second control units 150, 160, 170, and 190.

In this embodiment, two first control units 130 and 140 are coupled to the first communication bus 120, but the number of first control units coupled to the first communication bus 120 is not limited to this example. That is, the number of first control units coupled to the first communication bus 120 may be one, three, or more.

In this embodiment, three second control units 150, 160, and 170 are coupled to the second communication bus 122, but the number of second control units coupled to the second communication bus 122 is not limited to this example. That is, the number of second control units coupled to the second communication bus 122 may be one, two, four, or more.

In this embodiment, one first control unit 180 and one second control unit 190 are coupled to the third communication bus 124, but the numbers of first control units and second control units coupled to the third communication bus 124 are not limited to these examples. That is, the numbers of first control units and second control units coupled to the third communication bus 124 may be two or more. The number of first control units coupled to the third communication bus 124 may differ from the number of second control units coupled to the third communication bus 124.

The first control units 130, 140, and 180 and the second control units 150, 160, 170, and 190 may be control units for various electronic devices mounted on the vehicle 100. Examples of the first control units 130, 140, and 180 and the second control units 150, 160, 170, and 190 include an engine controller that controls the engine. Examples of the first control units 130, 140, and 180 and the second control units 150, 160, 170, and 190 include a motor controller that controls the motor. Examples of the first control units 130, 140, and 180 and the second control units 150, 160, 170, and 190 include a battery controller that controls a battery. Examples of the first control units 130, 140, and 180 and the second control units 150, 160, 170, and 190 include a wireless communicator that wirelessly communicates with a data center outside the vehicle 100. Examples of the first control units 130, 140, and 180 and the second control units 150, 160, 170, and 190 include a car navigation system controller that controls a car navigation system. Examples of the first control units 130, 140, and 180 and the second control units 150, 160, 170, and 190 include an autonomous driving controller that controls autonomous driving of the vehicle 100.

As illustrated in FIG. 1, the first control unit 130 includes one or more processors 132 and one or more memories 134 coupled to the processors 132. The first control unit 140 includes one or more processors 142 and one or more memories 144 coupled to the processors 142. The first control unit 180 includes one or more processors 182 and one or more memories 184 coupled to the processors 182.

As illustrated in FIG. 1, the second control unit 150 includes one or more processors 152 and one or more memories 154 coupled to the processors 152. The second control unit 160 includes one or more processors 162 and one or more memories 164 coupled to the processors 162. The second control unit 170 includes one or more processors 172 and one or more memories 174 coupled to the processors 172. The second control unit 190 includes one or more processors 192 and one or more memories 194 coupled to the processors 192.

Each of the processors 132, 142, 152, 162, 172, 182, and 192 includes, for example, a central processing unit (CPU). Each of the memories 134, 144, 154, 164, 174, 184, and 194 includes, for example, a read only memory (ROM) and a random access memory (RAM). The ROM is a storage element that stores programs and arithmetic parameters to be used by the CPU. The RAM is a storage element that temporarily stores data such as variables and parameters to be used for processes performed by the CPU.

Each of the memories 134, 144, 154, 164, 174, 184, and 194 stores, for example, information indicating a history of codes of malfunctions in each control unit.

In this embodiment, a first communication device 200 and a second communication device 210 can be coupled to the vehicle 100. The first communication device 200 and the second communication device 210 are different in terms of manufacturers.

In this embodiment, the first communication device 200 and the second communication device 210 are coupled to the vehicle 100 by wire. The first communication device 200 and the second communication device 210 may be coupled to the vehicle 100 by wireless. Communications among the first communication device 200, the second communication device 210, the intermediate unit 110, the first control units 130, 140, and 180, and the second control units 150, 160, 170, and 190 may be performed by using, for example, a controller area network (CAN) protocol.

When the first communication device 200 is coupled to the vehicle 100, the first communication device 200 can communicate bidirectionally with the vehicle 100. For example, the first communication device 200 can communicate bidirectionally with the first control units 130, 140, and 180 and the second control units 150, 160, 170, and 190 via the intermediate unit 110.

When the second communication device 210 is coupled to the vehicle 100, the second communication device 210 can communicate bidirectionally with the vehicle 100. For example, the second communication device 210 can communicate bidirectionally with the first control units 130, 140, and 180 and the second control units 150, 160, 170, and 190 via the intermediate unit 110.

The first communication device 200 and the second communication device 210 are dedicated terminals for diagnosing malfunctions in the first control units and the second control units of the vehicle 100. Examples of the first communication device 200 and the second communication device 210 include a personal computer. In FIG. 1, the first communication device 200 is coupled to the vehicle 100.

As illustrated in FIG. 1, the first communication device 200 includes one or more processors 202 and one or more memories 204 coupled to the processors 202. The second communication device 210 includes one or more processors 212 and one or more memories 214 coupled to the processors 212. Each of the processors 202 and 212 includes, for example, a CPU. Each of the memories 204 and 214 includes, for example, a ROM and a RAM.

The first communication device 200 and the second communication device 210 can transmit various messages to diagnose malfunctions in the first control units 130, 140, and 180 and the second control units 150, 160, 170, and 190 of the vehicle 100. Description is made about the structure of the message to be transmitted from the first communication device 200 or the second communication device 210 to any of the first control units 130, 140, and 180 and the second control units 150, 160, 170, and 190 of the vehicle 100.

FIG. 2 illustrates the structure of the message according to the embodiment of the disclosure. As illustrated in FIG. 2, the message includes an address part of 3 bytes and a command part of 5 bytes. The data size of the address part and the data size of the command part are examples, and are not limited to these examples.

The address part includes addresses of transmission destinations of the message. The addresses set in the address part are roughly categorized into a physical address that designates a specific transmission destination and a functional address that designates multiple transmission destinations. In this embodiment, the functional address designates all of the first control units 130, 140, and 180 and the second control units 150, 160, 170, and 190 of the vehicle 100 as the transmission destinations. The functional address may designate at least part of the first control units 130, 140, and 180 and the second control units 150, 160, 170, and 190 of the vehicle 100.

In this embodiment, the first communication device 200 is configured to set the functional address A in the address part of the message as the functional address that designates all of the first control units 130, 140, and 180 and the second control units 150, 160, 170, and 190 of the vehicle 100 as the transmission destinations. The first communication device 200 does not have a function of setting the functional address B in the address part of the message as the functional address that designates all of the first control units 130, 140, and 180 and the second control units 150, 160, 170, and 190 of the vehicle 100 as the transmission destinations. The first communication device 200 may be redesigned to have a function of setting both the functional address A and the functional address B in the address part of the message. However, such redesigning of the first communication device 200 may be difficult in view of avoiding an increase in designing costs.

In this embodiment, the second communication device 210 is configured to set the functional address B in the address part of the message as the functional address that designates all of the first control units 130, 140, and 180 and the second control units 150, 160, 170, and 190 of the vehicle 100 as the transmission destinations. The second communication device 210 does not have a function of setting the functional address A in the address part of the message as the functional address that designates all of the first control units 130, 140, and 180 and the second control units 150, 160, 170, and 190 of the vehicle 100 as the transmission destinations. The second communication device 210 may be redesigned to have a function of setting both the functional address A and the functional address B in the address part of the message. However, such redesigning of the second communication device 210 may be difficult in view of avoiding an increase in designing costs.

For example, the command part includes an information deletion command for instructing each of the first control units 130, 140, and 180 and the second control units 150, 160, 170, and 190 designated by the address part to delete the stored malfunction code history information.

For example, the command part includes an information request command for requesting each of the first control units 130, 140, and 180 and the second control units 150, 160, 170, and 190 designated by the address part to transmit the stored malfunction code history information.

The commands set in the command part are not limited to these commands. In this embodiment, various commands set in the command part can be identified irrespective of the types of the control units.

The intermediate unit 110 mediates the communications between the first communication device 200 or the second communication device 210 and the first control units 130, 140, and 180 and the second control units 150, 160, 170, and 190 of the vehicle 100.

As illustrated in FIG. 1, the intermediate unit 110 includes one or more processors 112 and one or more memories 114 coupled to the processors 112. The processor 112 includes, for example, a CPU. The memory 114 includes, for example, a ROM and a RAM.

The memory 114 of the intermediate unit 110 stores a functional address conversion table described later in detail. When a functional address is set in the address part of a message received from the first communication device 200 or the second communication device 210, the intermediate unit 110 can convert the functional address set in the address part of the received message based on the functional address conversion table.

In this embodiment, the first control units 130, 140, and 180 are configured to determine that a message including the functional address A is directed to them, and are not configured to determine that a message including the functional address B is directed to them. The second control units 150, 160, 170, and 190 are configured to determine that a message including the functional address B is directed to them, and are not configured to determine that a message including the functional address A is directed to them. That is, the control units different in terms of manufacturers use different functional addresses to determine that messages are directed to them.

In this embodiment, the first communication device 200 is configured to set the functional address A in the address part of a message, and is not configured to set the functional address B in the address part of a message. The second communication device 210 is configured to set the functional address B in the address part of a message, and is not configured to set the functional address A in the address part of a message. That is, the communication devices different in terms of manufacturers are configured to set different functional addresses in the address parts of messages.

As described above, the vehicle 100 may include the control units different in terms of manufacturers, and the communication devices different in terms of manufacturers may be coupled to the vehicle 100. When a message using the functional address is transmitted from the communication device to the vehicle 100, there is a possibility that the message cannot be transmitted to part of the control units as intended and the user's convenience decreases.

In this embodiment, the intermediate unit 110 converts the functional address set in the address part of the message based on the transmission destination control units and the types of the communication buses. Thus, the message transmitted from the communication device to the vehicle 100 can be transmitted to all the control units as intended, and the user's convenience can be improved.

FIG. 3 illustrates the functional address conversion table according to the embodiment of the disclosure. In the functional address conversion table in FIG. 3, functional addresses obtained by conversion are set for the individual types of the transmission destination communication buses based on the type of the functional address set in the address part of a received message.

FIG. 3 illustrates a rule that, when the functional address A is set in the address part of the received message, the message including the functional address A set in the address part is transmitted to all the control units coupled to the first communication bus 120.

FIG. 3 illustrates a rule that, when the functional address A is set in the address part of the received message, a message including the functional address B set in the address part is transmitted to all the control units coupled to the second communication bus 122.

FIG. 3 illustrates a rule that, when the functional address A is set in the address part of the received message, the message including the functional address A set in the address part and a message including the functional address B set in the address part are transmitted to all the control units coupled to the third communication bus 124. For example, the message including the functional address A set in the address part is transmitted to all the control units coupled to the third communication bus 124, and then the message including the functional address B set in the address part is transmitted to all the control units coupled to the third communication bus 124. The order of message transmission is not limited to this example. For example, the message including the functional address B set in the address part may be transmitted to all the control units coupled to the third communication bus 124, and then the message including the functional address A set in the address part may be transmitted to all the control units coupled to the third communication bus 124.

FIG. 3 illustrates a rule that, when the functional address B is set in the address part of the received message, a message including the functional address A set in the address part is transmitted to all the control units coupled to the first communication bus 120.

FIG. 3 illustrates a rule that, when the functional address B is set in the address part of the received message, the message including the functional address B set in the address part is transmitted to all the control units coupled to the second communication bus 122.

FIG. 3 illustrates a rule that, when the functional address B is set in the address part of the received message, a message including the functional address A set in the address part and the message including the functional address B set in the address part are transmitted to all the control units coupled to the third communication bus 124.

FIG. 3 illustrates a rule that, when a functional address X is set in the address part of the received message, a message including the functional address A set in the address part is transmitted to all the control units coupled to the first communication bus 120.

FIG. 3 illustrates a rule that, when the functional address X is set in the address part of the received message, a message including the functional address B set in the address part is transmitted to all the control units coupled to the second communication bus 122.

FIG. 3 illustrates a rule that, when the functional address X is set in the address part of the received message, a message including the functional address A set in the address part and a message including the functional address B set in the address part are transmitted to all the control units coupled to the third communication bus 124.

In this embodiment, various commands set in the command part are not subjected to the conversion process like the conversion process for the functional address.

In the manner described above, the intermediate unit 110 can convert the functional address set in the address part of the received message and transmit the messages including the functional addresses after the conversion to the control units or the communication buses. Thus, the message transmitted from the communication device to the vehicle 100 can be transmitted to all the control units as intended. Further, the increase in designing costs can be suppressed because of no redesigning of the control units and the communication devices.

The functional address conversion table illustrated in FIG. 3 is an example, and is not limited to this example. For example, when the vehicle 100 includes a fourth communication bus (not illustrated), a functional address conversion method is set based on the types of control units coupled to the fourth communication bus.

When a physical address is set in the address part of a message received from the first communication device 200 or the second communication device 210, the intermediate unit 110 performs a predetermined relay process without performing the above conversion process for the address part of the received message. Examples of specific processes to be performed in the vehicle 100 are described.

Figure 4:
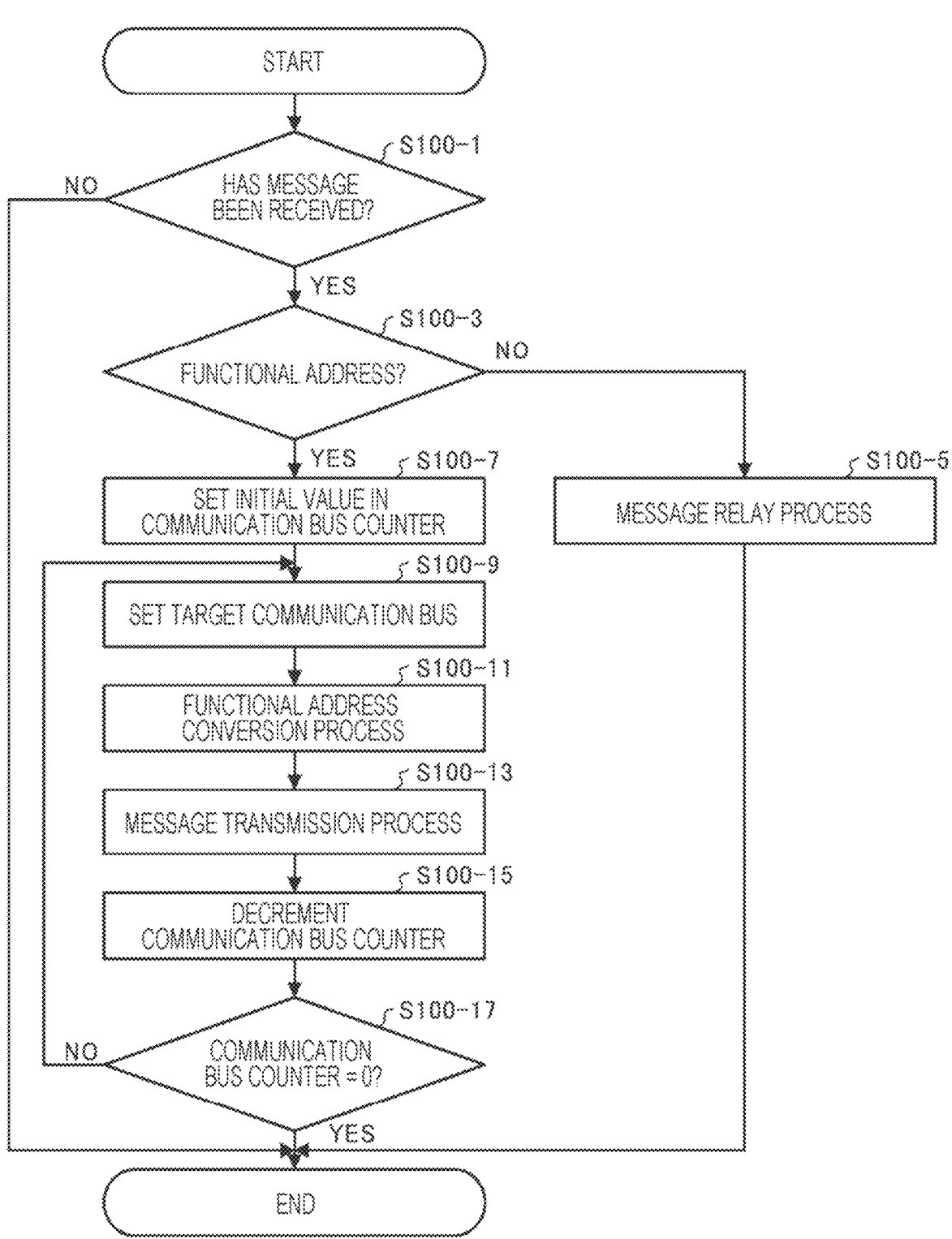
FIG. 4 is a flowchart illustrating an intermediate unit process according to the embodiment of the disclosure.

An intermediate unit process to be performed by the intermediate unit 110 is described. FIG. 4 is a flowchart illustrating the intermediate unit process according to the embodiment of the disclosure. The intermediate unit process is performed, for example, when an operator couples the first communication device 200 or the second communication device 210 to the vehicle 100. Various processes including the process described below can be performed by the processor 112 of the intermediate unit 110. For example, the processor 112 executes a program stored in the memory 114 of the intermediate unit 110 to perform the various processes.

As illustrated in FIG. 4, the intermediate unit 110 determines whether a message is received from the first communication device 200 or the second communication device 210 (S100-1). When a message is received (YES in S100-1), the intermediate unit 110 advances the process to Step S100-3 described later. When no message is received (NO in S100-1), the intermediate unit 110 terminates the intermediate unit process.

The intermediate unit 110 determines whether a functional address is set in the address part of the received message (S100-3). When no functional address is set in the address part of the received message (NO in S100-3), that is, when a physical address is set in the address part of the received message, the intermediate unit 110 advances the process to Step S100-5. When a functional address is set in the address part of the received message (YES in S100-3), the intermediate unit 110 advances the process to Step S100-7.

The intermediate unit 110 performs a relay process for relaying the received message (S100-5), and terminates the intermediate unit process. For example, the intermediate unit 110 transmits the received message to a control unit designated by the physical address set in the address part of the received message or to a communication bus to which this control unit is coupled.

The intermediate unit 110 sets a predetermined initial value in a communication bus counter stored in the memory 114 (S100-7). The set value of the communication bus counter is decremented in Step S100-15 described later. The set initial value is the same as the total number of the communication buses of the vehicle 100. Since the vehicle 100 includes the first communication bus 120, the second communication bus 122, and the third communication bus 124 in this embodiment, an initial value "3" is set in the communication bus counter.

The intermediate unit 110 sets a communication bus serving as a communication target based on the value of the communication bus counter (S100-9). For example, when the value of the communication bus counter is "3", the third communication bus 124 is set as the communication target. When the value of the communication bus counter is "2", the second communication bus 122 is set as the communication target. When the value of the communication bus counter is "1", the first communication bus 120 is set as the communication target.

The intermediate unit 110 performs a functional address conversion process (S100-11). For example, the intermediate unit 110 converts the functional address based on the functional address set in the address part of the message received in Step S100-1, the type of the communication bus serving as the communication target set in Step S100-9, and the functional address conversion table illustrated in FIG. 3. For example, when the functional address A is set in the address part of the received message and the second communication bus 122 is set as the communication target, the intermediate unit 110 refers to the functional address conversion table illustrated in FIG. 3 and sets the functional address B as a result of the functional address conversion process.

The intermediate unit 110 performs a message transmission process (S100-13). For example, the intermediate unit 110 generates a message by replacing the functional address set in the address part of the message received in Step S100-1 with the functional address obtained through the functional address conversion process in Step S100-11. The intermediate unit 110 transmits the generated message to the communication bus serving as the communication target set in Step S100-9.

In this embodiment, various commands set in the command part can be identified irrespective of the types of the control units. That is, in this embodiment, the commands set in the command part are not subjected to the conversion process like the conversion process for the functional address. If the commands set in the command part are identified based on the types of the control units, the commands set in the command part may be subjected to the conversion process like the conversion process for the functional address in addition to the conversion of the functional address.

The intermediate unit 110 decrements the value of the communication bus counter (S100-15).

The intermediate unit 110 determines whether the value of the communication bus counter is "0" as a result of the process in Step S100-15 (S100-17). When the value of the communication bus counter is "0" (YES in S100-17), the intermediate unit 110 terminates the intermediate unit process. When the value of the communication bus counter is not "0" (NO in S100-17), the intermediate unit 110 advances the process to Step S100-9 and repeats the process from Step S100-9 to Step S100-17 until the value of the communication bus counter reaches "0".

Figure 5:
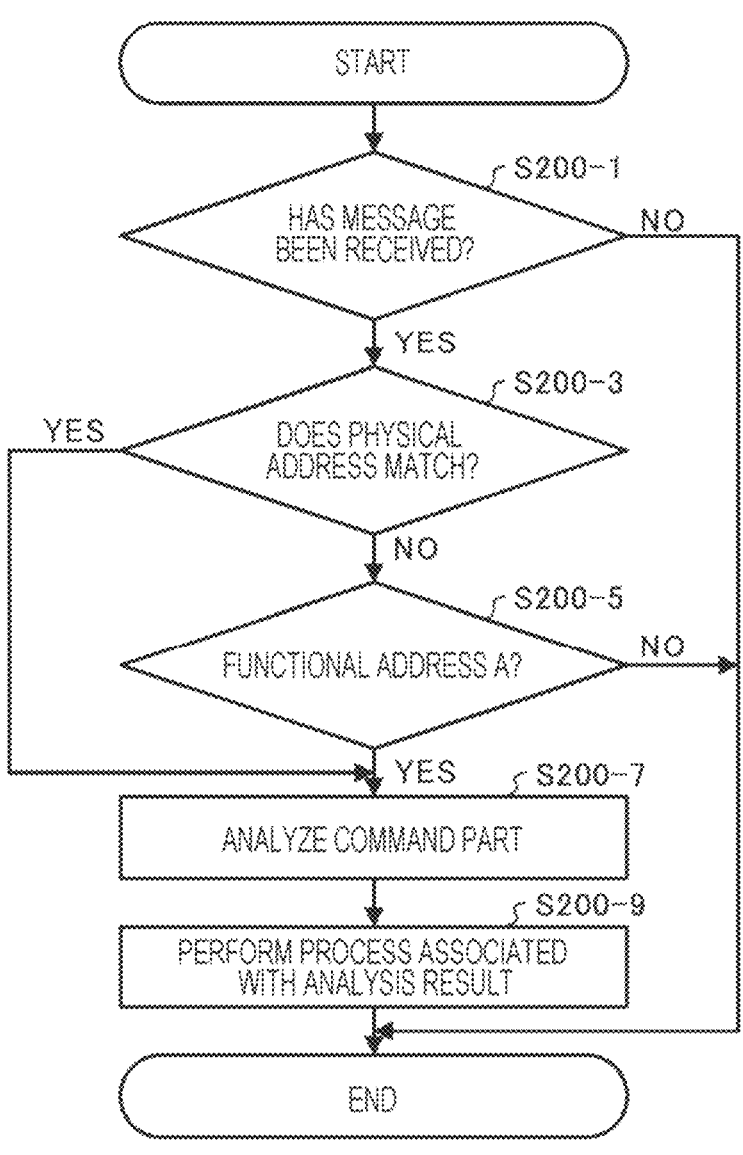
FIG. 5 is a flowchart illustrating a first control unit process according to the embodiment of the disclosure.

A first control unit process to be performed by each of the first control units 130, 140, and 180 is described. FIG. 5 is a flowchart illustrating the first control unit process according to the embodiment of the disclosure. Various processes including the process described below can be performed by each of the processors 132, 142, and 182 of the first control units 130, 140, and 180. For example, each of the processors 132, 142, and 182 executes a program stored in each of the memories 134, 144, and 184 of the first control units 130, 140, and 180 to perform the various processes.

In this embodiment, the first control unit process is performed by timer interruption at predetermined time intervals. The first control unit process to be performed by the first control unit 130 is described as an example.

As illustrated in FIG. 5, the first control unit 130 determines whether a message is received from the first communication device 200 or the second communication device 210 via the intermediate unit 110 (S200-1). When no message is received (NO in S200-1), the first control unit 130 terminates the first control unit process. When a message is received (YES in S200-1), the first control unit 130 advances the process to Step S200-3.

The first control unit 130 determines whether a physical address indicating the first control unit 130 is set in the address part of the received message (S200-3). When the physical address indicating the first control unit 130 is set in the address part of the received message (YES in S200-3), the first control unit 130 advances the process to Step S200-7 described later. When the physical address indicating the first control unit 130 is not set in the address part of the received message (NO in S200-3), the first control unit 130 advances the process to Step S200-5.

The first control unit 130 determines whether the functional address A is set in the address part of the received message (S200-5). When the functional address A is set (YES in S200-5), the first control unit 130 advances the process to Step S200-7 described later. When the functional address A is not set (NO in S200-5), the first control unit 130 terminates the first control unit process.

The first control unit 130 analyzes a command set in the command part of the received message (S200-7).

The first control unit 130 performs a process associated with a result of the analysis in Step S200-7 (S200-9), and terminates the first control unit process. For example, when an information deletion command is set in the command part of the received message, the first control unit 130 performs a process of deleting the malfunction code history information stored in the memory 134.

Figure 6:
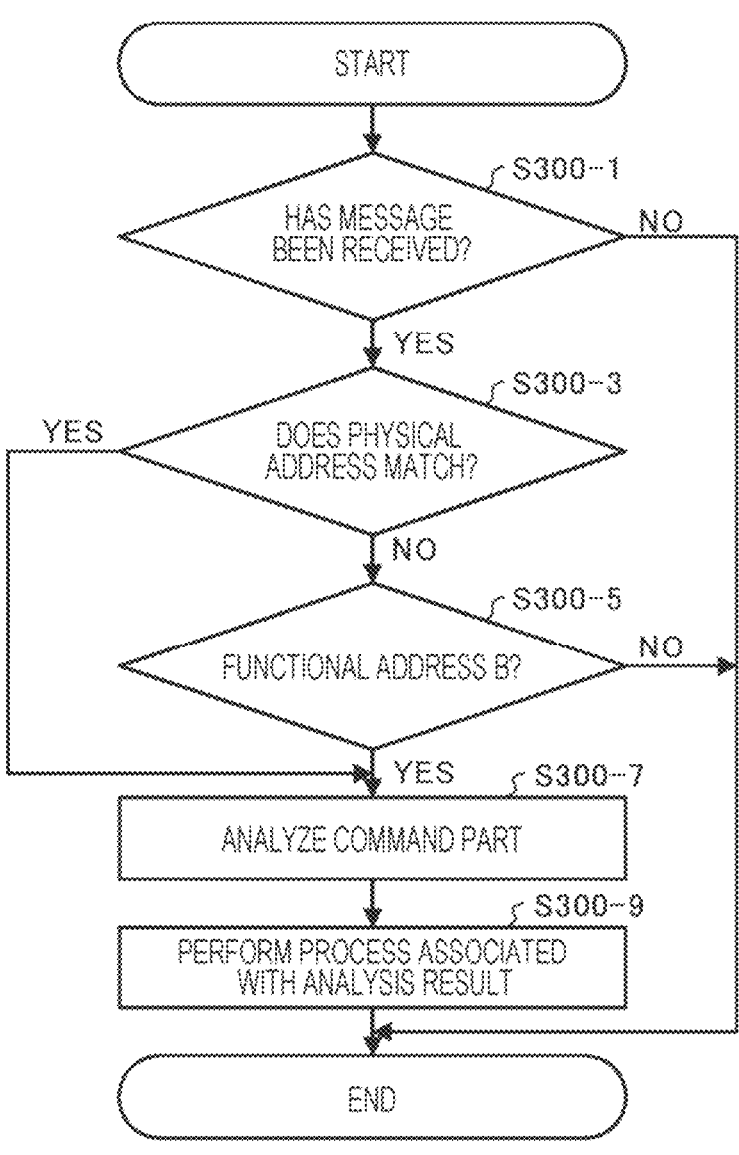
FIG. 6 is a flowchart illustrating a second control unit process according to a modification of the disclosure.

A second control unit process to be performed by each of the second control units 150, 160, 170, and 190 is described. FIG. 6 is a flowchart illustrating the second control unit process according to the embodiment of the disclosure. Various processes including the process described below can be performed by each of the processors 152, 162, 172, and 192 of the second control units 150, 160, 170, and 190. For example, each of the processors 152, 162, 172, and 192 executes a program stored in each of the memories 154, 164, 174, and 194 of the second control units 150, 160, 170, and 190 to perform the various processes.

In this embodiment, the second control unit process is performed by timer interruption at predetermined time intervals. The second control unit process to be performed by the second control unit 150 is described as an example.

As illustrated in FIG. 6, the second control unit 150 determines whether a message is received from the first communication device 200 or the second communication device 210 via the intermediate unit 110 (S300-1). When no message is received (NO in S300-1), the second control unit 150 terminates the second control unit process. When a message is received (YES in S300-1), the second control unit 150 advances the process to Step S300-3.

The second control unit 150 determines whether a physical address indicating the second control unit 150 is set in the address part of the received message (S300-3). When the physical address indicating the second control unit 150 is set in the address part of the received message (YES in S300-3), the second control unit 150 advances the process to Step S300-7 described later. When the physical address indicating the second control unit 150 is not set in the address part of the received message (NO in S300-3), the second control unit 150 advances the process to Step S300-5.

The second control unit 150 determines whether the functional address B is set in the address part of the received message (S300-5). When the functional address B is set (YES in S300-5), the second control unit 150 advances the process to Step S300-7 described later. When the functional address B is not set (NO in S300-5), the second control unit 150 terminates the second control unit process.

The second control unit 150 analyzes a command set in the command part of the received message (S300-7).

The second control unit 150 performs a process associated with a result of the analysis in Step S300-7 (S300-9), and terminates the second control unit process. For example, when an information deletion command is set in the command part of the received message, the second control unit 150 performs a process of deleting the malfunction code history information stored in the memory 154.

As described above, the vehicle 100 according to this embodiment is the vehicle 100 to which a communication device (e.g., the first communication device 200 and the processor 202) is to be coupled.

The vehicle 100 includes one or more first units (e.g., the first control units 130, 140, 180).

The vehicle 100 includes one or more second units (e.g., the second control units 150, 160, 170, 190).

The vehicle 100 includes the intermediate unit 110 configured to mediate communication between the communication device (e.g., the first communication device 200 or the second communication device 210) and the first unit (e.g., the first control units 130, 140, 180) or the second unit (e.g., the second control units 150, 160, 170, 190).

The intermediate unit 110 includes one or more intermediate unit processors (processor 112) and one or more intermediate unit memories (memory 114) coupled to the intermediate unit processor (processor 112).

The intermediate unit processor (processor 112) is configured to, when a message including a first functional address (e.g., the functional address A) for the first unit (e.g., the first control units 130, 140, 180) and a predetermined command (e.g., the information deletion command) is received from the communication device (e.g., the first communication device 200), perform a process including transmitting the message including the first functional address (e.g., the functional address A) and the predetermined command (e.g., the information deletion command) to the first unit (e.g., the first control units 130, 140, 180) (e.g., Steps S100 in the above embodiment, FIG. 3).

The intermediate unit processor (processor 112) is configured to, when a message including a second functional address (e.g., the functional address B) for the second unit (e.g., the second control units 150, 160, 170, 190) and the predetermined command (e.g., the information deletion command) is received from the communication device (e.g., the second communication device 210), perform a process including transmitting the message including the first functional address (e.g., the functional address A) and the predetermined command (e.g., the information deletion command) to the first unit (e.g., the first control units 130, 140, 180) (e.g., Steps S100 in the above embodiment, FIG. 3).

The intermediate unit processor (processor 112) is configured to, when the message including the first functional address (e.g., the functional address A) and the predetermined command (e.g., the information deletion command) is received from the communication device (e.g., the first communication device 200), perform a process including transmitting the message including the second functional address (e.g., the functional address B) and the predetermined command (e.g., the information deletion command) to the second unit (e.g., the second control units 150, 160, 170, 190) (e.g., Steps S100 in the above embodiment, FIG. 3).

The intermediate unit processor (processor 112) is configured to, when the message including the second functional address (e.g., the functional address B) and the predetermined command (e.g., the information deletion command) is received from the communication device (e.g., the second communication device 210), perform a process including transmitting the message including the second functional address (e.g., the functional address B) and the predetermined command (e.g., the information deletion command) to the second unit (e.g., the second control units 150, 160, 170, 190) (e.g., Steps S100 in the above embodiment, FIG. 3).

In the vehicle 100 of this embodiment, for example, even when the control units different in terms of manufacturers are mounted, the message transmitted from the communication device to the vehicle 100 can be transmitted to all the control units as intended, and the user's convenience can be improved.

The vehicle 100 may include the first communication bus 120 to which the one or more first units (e.g., the first control units 130, 140) are coupled.

The vehicle 100 may include the second communication bus 122 to which the one or more second units (e.g., the second control units 150, 160, 170) are coupled.

The intermediate unit processor (processor 112) may be configured to, when the message including the first functional address (e.g., the functional address A) and the predetermined command (e.g., the information deletion command) is received from the communication device (e.g., the first communication device 200), perform a process including transmitting the message including the first functional address (e.g., the functional address A) and the predetermined command (e.g., the information deletion command) to the first communication bus 120 (e.g., Steps S100 in the above embodiment, FIG. 3).

The intermediate unit processor (processor 112) may be configured to, when the message including the second functional address (e.g., the functional address B) and the predetermined command (e.g., the information deletion command) is received from the communication device (e.g., the second communication device 210), perform a process including transmitting the message including the first functional address (e.g., the functional address A) and the predetermined command (e.g., the information deletion command) to the first communication bus 120 (e.g., Steps S100 in the above embodiment, FIG. 3).

The intermediate unit processor (processor 112) may be configured to, when the message including the first functional address (e.g., the functional address A) and the predetermined command (e.g., the information deletion command) is received from the communication device (e.g., the first communication device 200), perform a process including transmitting the message including the second functional address (e.g., the functional address B) and the predetermined command (e.g., the information deletion command) to the second communication bus 122 (e.g., Steps S100 in the above embodiment, FIG. 3).

The intermediate unit processor (processor 112) may be configured to, when the message including the second functional address (e.g., the functional address B) and the predetermined command (e.g., the information deletion command) is received from the communication device (e.g., the second communication device 210), perform a process including transmitting the message including the second functional address (e.g., the functional address B) and the predetermined command (e.g., the information deletion command) to the second communication bus 122 (e.g., Steps S100 in the above embodiment, FIG. 3).

By switching the messages to be transmitted based on the types of the communication buses, the possibility of an increase in the communication amount can be reduced, and the possibility of communication delay can be reduced.

The vehicle 100 may include the third communication bus 124 to which the one or more first units (e.g., the first control unit 180) and the one or more second units (e.g., the second control unit 190) are coupled.

The intermediate unit processor (processor 112) may be configured to, when the message including the first functional address (e.g., the functional address A) and the predetermined command (e.g., the information deletion command) is received from the communication device (e.g., the first communication device 200), perform a process including transmitting the message including the first functional address (e.g., the functional address A) and the predetermined command (e.g., the information deletion command) and the message including the second functional address (e.g., the functional address B) and the predetermined command (e.g., the information deletion command) to the third communication bus 124 (e.g., Steps S100 in the above embodiment, FIG. 3).

The intermediate unit processor (processor 112) may be configured to, when the message including the second functional address (e.g., the functional address B) and the predetermined command (e.g., the information deletion command) is received from the communication device (e.g., the second communication device 210), perform a process including transmitting the message including the first functional address (e.g., the functional address A) and the predetermined command (e.g., the information deletion command) and the message including the second functional address (e.g., the functional address B) and the predetermined command (e.g., the information deletion command) to the third communication bus 124 (e.g., Steps S100 in the above embodiment, FIG. 3).

With this configuration, the messages can appropriately be transmitted based on the types of the communication buses. Thus, the possibility of an increase in the communication amount can be reduced, and the user's convenience can be improved.

Although the embodiment of the disclosure is described above with reference to the accompanying drawings, the embodiment of the disclosure is not limited to this embodiment. It is understood that various modifications and revisions are conceivable by persons having ordinary skill in the art within the scope of claims and are included in the technical scope disclosed herein.

In the above embodiment, the vehicle 100 is a hybrid vehicle, but may be various types of vehicle such as a gasoline vehicle, an electric vehicle (EV), a plug-in hybrid vehicle (PHEV), and a non-plug-in hybrid vehicle (hybrid vehicle).

The series of processes to be performed by the vehicle 100 according to the above embodiment may be implemented by using software, hardware, or a combination of software and hardware. Programs serving as software are prestored in, for example, non-transitory media provided inside or outside each device. For example, the programs are read from the non-transitory medium (e.g., a ROM), loaded in a transitory medium (e.g., a RAM), and executed by a processor such as a CPU.

According to the above embodiment, programs for performing the processes of the functions of the vehicle 100 can be provided. Further, non-transitory computer-readable media storing the programs can be provided. The non-transitory media may be disc (disk) media such as an optical disc, a magnetic disk, and a magneto-optical disk, or may be semiconductor memories such as a flash memory and a USB memory.

According to the embodiment of the disclosure, the convenience in the communication between the vehicle and the communication device can be improved.

The intermediate unit 110 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the intermediate unit 110. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle to which a communication device is to be coupled, the vehicle comprising:
   one or more first units;
   one or more second units; and
   an intermediate unit configured to mediate communication between the communication device and the one or more first units or the one or more second units,
   wherein the intermediate unit comprises one or more intermediate unit processors and one or more intermediate unit memories coupled to the one or more intermediate unit processors, and
   wherein the one or more intermediate unit processors are configured to perform a process comprising:
      when a message including a first functional address for the one or more first units and a predetermined command is received from the communication device, transmitting the message including the first functional address and the predetermined command to the one or more first units;
      when a message including a second functional address for the one or more second units and the predetermined command is received from the communication device, transmitting the message including the first functional address and the predetermined command to the one or more first units;

when the message including the first functional address and the predetermined command is received from the communication device, transmitting the message including the second functional address and the predetermined command to the one or more second units; and when the message including the second functional address and the predetermined command is received from the communication device, transmitting the message including the second functional address and the predetermined command to the one or more second units.

2. The vehicle according to claim 1, further comprising:

a first communication bus to which the one or more first units are coupled; and a second communication bus to which the one or more second units are coupled, wherein the one or more intermediate unit processors are configured to perform a process comprising:

when the message including the first functional address and the predetermined command is received from the communication device, transmitting the message including the first functional address and the predetermined command to the first communication bus;

when the message including the second functional address and the predetermined command is received from the communication device, transmitting the message including the first functional address and the predetermined command to the first communication bus;

when the message including the first functional address and the predetermined command is received from the communication device, transmitting the message including the second functional address and the predetermined command to the second communication bus; and when the message including the second functional address and the predetermined command is received from the communication device, transmitting the message including the second functional address and the predetermined command to the second communication bus.

3. The vehicle according to claim 1, further comprising a third communication bus to which the one or more first units and the one or more second units are coupled, wherein the one or more intermediate unit processors are configured to perform a process comprising:

when the message including the first functional address and the predetermined command is received from the communication device, transmitting the message including the first functional address and the predetermined command and the message including the second functional address and the predetermined command to the third communication bus; and when the message including the second functional address and the predetermined command is received from the communication device, transmitting the message including the first functional address and the predetermined command and the message including the second functional address and the predetermined command to the third communication bus.

4. The vehicle according to claim 2, further comprising a third communication bus to which the one or more first units and the one or more second units are coupled, wherein the one or more intermediate unit processors are configured to perform a process comprising:

when the message including the first functional address and the predetermined command is received from the communication device, transmitting the message including the first functional address and the predetermined command and the message including the second functional address and the predetermined command to the third communication bus; and when the message including the second functional address and the predetermined command is received from the communication device, transmitting the message including the first functional address and the predetermined command and the message including the second functional address and the predetermined command to the third communication bus.

* * * * *